C. MOORE.
GATE LATCH.
APPLICATION FILED OCT. 17, 1912.
1,062,110.
Patented May 20, 1913.
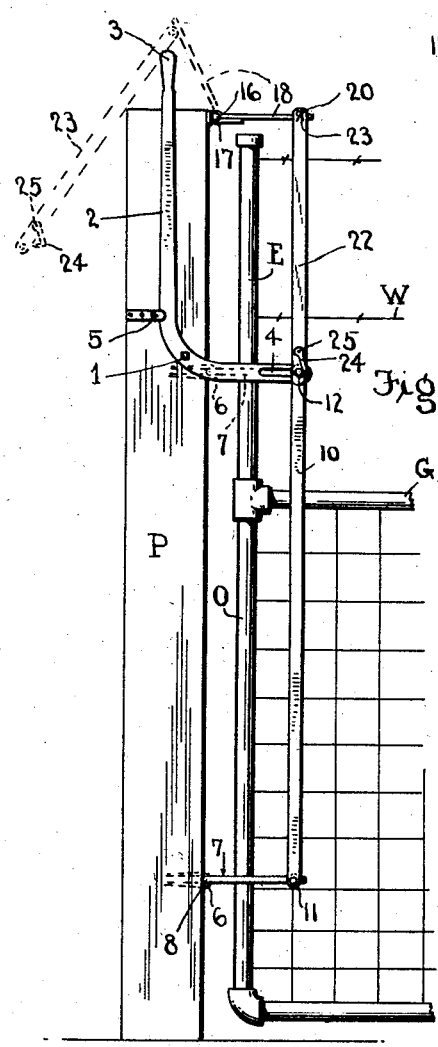
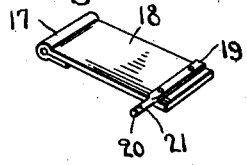
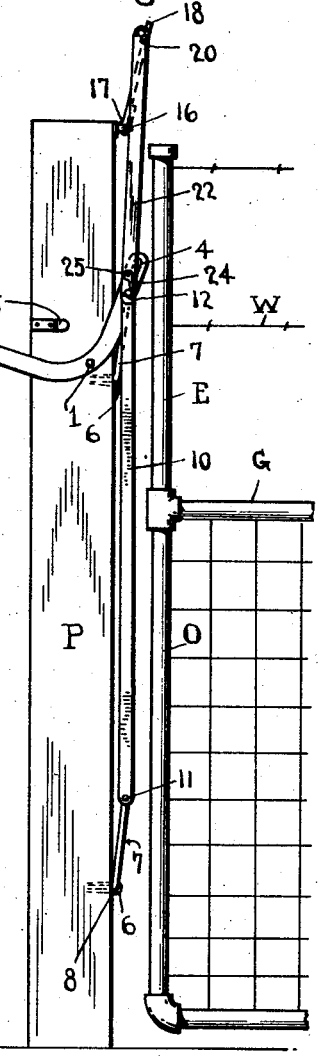
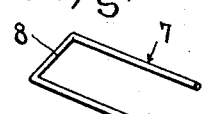
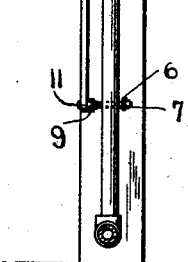
Inventor
Calvin Moore

UNITED STATES PATENT OFFICE.

CALVIN MOORE, OF NEW PROVIDENCE, IOWA.

GATE-LATCH.

1,062,110.  Specification of Letters Patent.  Patented May 20, 1913.

Application filed October 17, 1912. Serial No. 726,332.

*To all whom it may concern:*

Be it known that I, CALVIN MOORE, a citizen of the United States, residing at New Providence, in the county of Hardin and State of Iowa, have invented certain new and useful Improvements in Gate-Latches; and I do declare the following to be a full, clear, and exact description of the invention, such as will enable others skilled in the art to which it appertains to make and use the same.

This invention relates to latches, and more especially to those intended for use on gates; and the object of the same is to produce a gate latch capable of use in connection with a gate which is adjustable vertically at its hinge end, and having means whereby when the gate is latched in its normal position it is impossible for small animals to crawl beneath it and raise it on its hinges. This object is carried out by constructing the latch in the manner hereinafter more fully described and claimed, and as shown in the drawings wherein—

Figure 1 is a side elevation of the free end of a gate fastened by this improved latch, and Fig. 2 is a similar elevation showing the latch as raised or unlatched. Fig. 3 is a vertical section through the gate and an edge view of the latch when standing as shown in Fig. 1. The other views are perspective details, Fig. 4 showing the keeper for the main lever, Fig. 5 the plate, Fig. 6 the loop on which the plate is hinged, Fig. 7 one of the latches proper, and Fig. 8 the connecting bolt between the link and rod—all as hereinafter referred to again.

In the drawings the letter G designates a gate whereof the outer bar O of its frame moves adjacent the latch post P and in the present instance is shown as extended upward as at E so that it may carry wires W additional to the mesh of the gate itself, which wires may be barbed as shown so that horses and other large stock cannot pass their heads over the gate or perhaps injure its top bar if its frame be of wood.

It will be understood that the construction of the gate itself forms no part of the present invention, nor do its hinges excepting that the latter are of such type that the gate may be vertically adjusted as when it is desired to set it at a slight distance from the ground so as to permit small animals to pass beneath it.

Coming now more particularly to the present invention, at the point 1 I pivot to one side of the post P the angle of an L-shaped lever 2 whereof one arm stands normally upright and has a hand piece or handle 3 and the other arm stands normally horizontal and is slotted as at 4, this arm being of sufficient length to project considerably past the outer bar O of the gate frame. The lever is by preference so disposed that the lower arm extends across the extension E of the gate and the upper arm stands alongside the post P so that its handle 3 stands above the same and can be readily reached by the operator. Secured to the side of the post is a keeper 5 with which the lever 2 is engaged when it stands in its normal position as seen in Fig. 1.

Pivoted to the inner face of the post P, as by staples 6, are several latches proper, two being shown in the present instance and one of them illustrated in detail in Fig. 7. Each latch comprises a U-shaped body 7 whose cross bar 8 is engaged with the staple 6 in the present instance, and one of whose arms has an eye 9 near its outer extremity, and the arms are spaced sufficiently far apart to loosely embrace the outer bar O of the gate when the latter is latched. I have shown the lower latch as standing near the lower end of the outer bar, and the upper latch (see dotted lines in Fig. 1) as standing astride the extension E, although it will be obvious that in some cases a single latch would answer and in other cases there might have to be more than two as shown; but when a plurality of latches are employed they are caused to work in unison by means of a connecting rod 10 which is pivoted in any ordinary manner as at 11 to the eyes 9 of all latches excepting the uppermost, and the upper end of the rod is connected with the eye of the uppermost latch by means of a bolt 12 (see Fig. 8) having a plurality of perforations 13 and 14 through its shank. When this bolt is passed through the eye 9 of the uppermost latch and a corresponding eye at the upper end of the rod 10, first a split pin 15 is put through the inner perforation 13 to pivotally connect the rod with the latch, and then the outer end of the bolt is passed through the slot 4 in the lever 2 and a fastening device is passed through the outermost perforation 14 to pivotally connect the bolt and therefore the pivotal point between the rod and the upper latch, with the lever, because said bolt is movably mounted in the slot 4 and the pivotal points 8 and 1 are not the same.

It follows that when the parts stand in the position shown in Fig. 1, the bolt 12 is at the outer end of the slot 4 and the parts can drop no lower; but when the lever is moved to the rear its slotted end rises and carries the bolt with it, and the bolt lifting the rod 10 swings all of the latches 7 on their pivotal points 8 until the lever reaches the position shown in Fig. 2 when the pivotal points 9 are nearly above the pivotal points 8 and the weight of the handle end 3 of the lever is sufficient to hold the parts in this position as will be clear. When the parts are returned to the position shown in Fig. 1, the handle end of the lever is engaged behind the keeper 5 so that the gate is held latched.

So much of my invention as has been described will effectively latch a gate when closed, but when the lever is thrown back in Fig. 2 it will release the outer bar O of the gate, so that the latter may be swung in either direction. Moreover it is not essential to the successful operation of this device that the gate shall always swing in the plane illustrated in the drawings, for it is clear that it might be raised at its hinge end so as to swing in a higher plane as is sometimes desirable and still the latch would operate successfully.

Hingedly connected with the upper end of the post P, as by a loop 16 (see Fig. 6) is a knuckle 17 at the inner end of a plate 18 across whose outer end is secured a metallic strap 19 reduced and rounded at one extremity into a pin 20 provided with a perforation 21.

The numeral 22 designates a short link having an eye at its upper end adapted to be slipped over the pin 20, after which a split pin 23 is inserted through said perforation 21 to hold the link pivotally connected therewith. The lower end of this link has another eye adapted to be slipped over the extremity of the bolt 12, and for holding it detachably connected therewith I provide a hook latch 24 pivoted at 25 to one side of the link and with its bill positioned so as to pass through the outermost perforation in said bolt 12. The plate 18 is therefore connected with the uppermost latch, and by the rod 10 with all the latches, by means of this link and its detachable connection with the upper pivot 12; and thereafter the plate must move around its hinge simultaneously with the movements of the several latches. It follows that when the parts stand as seen in Fig. 1 this plate projects horizontally outward from the post P and extends across the upper end of the extension E, and therefore small animals cannot push under the lower bar of the gate G and raise the same on its hinges and crawl under, yet the operation of latching and unlatching the gate is the same. When now it is desired to raise the gate on its hinges, the link 22 is disconnected from the pivot bolt 12 by throwing back the latch hook 24, and the plate 18 and link 22 thrown over to the position shown in dotted lines in Fig. 1, so that thereafter the gate may be set to a higher level as will be clear and yet the several latches 7 will operate as first above described.

I consider this attachment a refinement or amplification of the general idea, because when in use it does not interfere with the ordinary actions of the gate and does not in fact touch the same at all, and when thrown out of use or to the dotted position shown in Fig. 1 it permits the height of the gate to be adjusted at will.

In manufacturing and selling this device, it may be sold without this attachment to those who have no use for it, or the device may be sold with the attachment and the purchaser can use it or not as desired and as per instructions which will no doubt be provided with the article when sold.

The parts are by preference entirely of metal, properly treated to prevent rust, and the exact details are not essential otherwise than as herein described and claimed.

What is claimed as new is:

1. In a gate latch, the combination with a U-shaped latch whose cross bar is hingedly connected with the inner face of the latch-post and whose arms are adapted to pass astride the outer bar of the gate, one of said arms having an eye near its outer end; of an L-shaped lever pivoted at its angle to the side of the latch post and having a slot in its lower arm adapted to aline with said eye, a pivotal connection between said eye and slot, and a keeper on the post with which the upright arm of said lever is engaged when its other arm stands horizontal, for the purpose set forth.

2. In a gate latch, the combination with a plurality of U-shaped latches whose cross bars are pivoted to the inner face of the latch-post and whose arms are adapted to stand astride the outer gate-bar, one arm of each latch being pierced with an eye, a connecting rod, and pivots through said rod near its ends and the eyes of said latches, one of said pivots being extended and pierced with a transverse perforation; of an L-shaped lever pivoted at its angle to the side of the latch-post and having a slot in its lower arm engaging said extended pivot, a fastening device through the perforation in the latter outside said slotted arm, and means for retaining the other arm of said lever in upright position when said latches stand astride the outer bar of the gate.

3. In a gate latch, the combination with a pair of U-shaped latches whose cross bars are hingedly connected with the inner face of the latch-post and whose arms are adapted to stand astride the outer bar of the gate when the latter is latched, a lever pivoted between its ends to the side of the post and having its inner arm slotted, a rod pivotally connected with the lower latch, and a pivotal connection between the upper latch and the upper end of said rod and passing through the slot in the inner arm of said lever; of a plate hingedly connected to the inner face of said latch post at a higher point than the uppermost latch and adapted to stand across the upper end of the outer bar of the gate, a link pivotally connected with the free end of said plate, and detachable connections between the lower end of said link and the upper end of said rod.

4. In a gate latch, the combination with a pair of U-shaped latches whose cross bars are hingedly connected with the inner face of the latch-post and whose arms are adapted to stand astride the outer bar of the gate when the latter is latched, a lever pivoted to the post and having its inner arm slotted, a rod pivotally connected with the lower latch, and a pivot bolt connecting the upper latch and the upper end of said rod and passing through the slot in the inner arm of said lever and perforated; of a plate hinged to said latch-post and adapted to stand across the upper end of the gate, a link pivotally connected with said plate and having an eye in its lower end adapted to be passed over the outer end of said bolt, and a latch hook pivoted to said link with its bill in position to pass through the perforation in said pivot bolt.

5. In a gate latch, the combination with a U-shaped latch whose cross bar is pivoted to the inner face of the latch post and whose arms are adapted to stand astride the outer bar of the gate when the latter is latched, one of said arms having an eye, and means for turning this latch on its pivot; of a plate hinged at one end to the inner face of said latch post and adapted to extend over the upper end of said inner bar of the gate, a strap secured across the other end of said plate and having a projecting pin provided with a perforation, a link having eyes at its extremities, one of them mounted on said pin, a split pin through the perforation in the latter, a bolt passing through the other eye in said link and the eye in said latch, and means for holding said bolt removably in place.

6. In a gate latch, the combination with a plurality of latches hingedly connected with the inner face of the latch post and adapted to pass astride the outer bar of the gate when the latter is latched, a lever and connecting rod for raising all of said latches in unison, and a pivot bolt connecting said lever and rod and having a perforation through it; of a plate hingedly connected with the inner face of the latch-post above all said latches and adapted to extend across the upper end of the inner bar of said gate, a link pivotally connected with said plate and having an eye near one end adapted to pass over said bolt so as to hold the plate in parallelism with said latches, and a latch hook pivoted to said link in position for its bill to pass through said perforation in the bolt, for the purpose set forth.

In testimony whereof I have hereunto set my hand in presence of two subscribing witnesses.

CALVIN MOORE.

Witnesses:
E. H. MOON,
L. S. GREENE.